J. M. SHOOK.
CREAM SEPARATING MILK BOTTLE.
APPLICATION FILED MAY 5, 1919.

1,348,062.

Patented July 27, 1920.

Witnesses
R. O. Thomas

Inventor
Jennie M. Shook

By Victor J. Evans
Attorney

UNITED STATES PATENT OFFICE.

JENNIE M. SHOOK, OF PHOENIX, ARIZONA.

CREAM-SEPARATING MILK-BOTTLE.

1,348,062. Specification of Letters Patent. Patented July 27, 1920.

Application filed May 5, 1919. Serial No. 294,983.

*To all whom it may concern:*

Be it known that I, Mrs. JENNIE M. SHOOK, a citizen of the United States, residing at Phoenix, in the county of Maricopa and State of Arizona, have invented new and useful Improvements in Cream-Separating Milk-Bottles, of which the following is a specification.

This invention relates to receptacles, particularly to milk bottles or containers, and has for its object the provision of a milk container which is provided at its lower end with outlet means whereby after the cream has risen to the top of the milk within the container the milk may be withdrawn through the bottom outlet until only the cream remains in the receptacle, the cream being then withdrawable through either the bottom outlet or from the top of the bottle by tilting the same in the ordinary manner.

An important object is the provision of a bottle of this character which is provided in its lower portion with thickened walls defining a trough shaped formation at the bottom of the receptacle effectively serving to conduct the milk to the bottom outlet means so that practically all of the milk may be separated from the cream.

A further object is the provision of a receptacle of this character which is adapted to have its upper portion closed by the ordinary card board cap, it being intended that the cap be provided with a perforation normally closed by a removable closure similar to a headed tack whereby upon removal of this closure, air will be permitted to enter the receptacle to a sufficient extent to permit ready withdrawal of the milk through the bottom outlet.

A further object is the provision of a receptacle of this character which will be very simple and inexpensive in manufacture, highly efficient in use, durable and sanitary in service, and a general improvement in the art.

With the above and other objects and advantages in view, the invention consists in the details of construction to be hereinafter more fully described and claimed, and illustrated in the accompanying drawing, in which—

Figure 1:
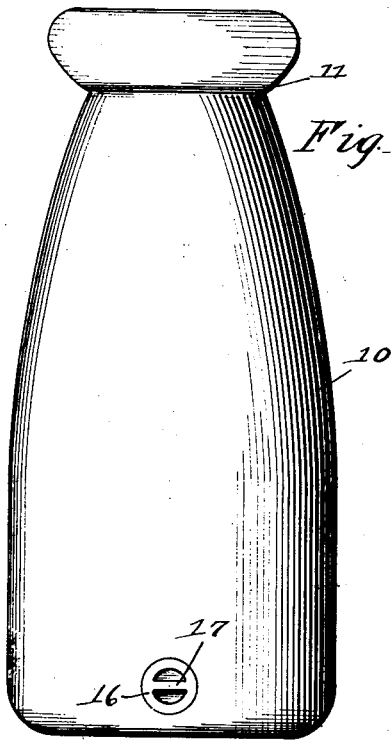
Figure 2:
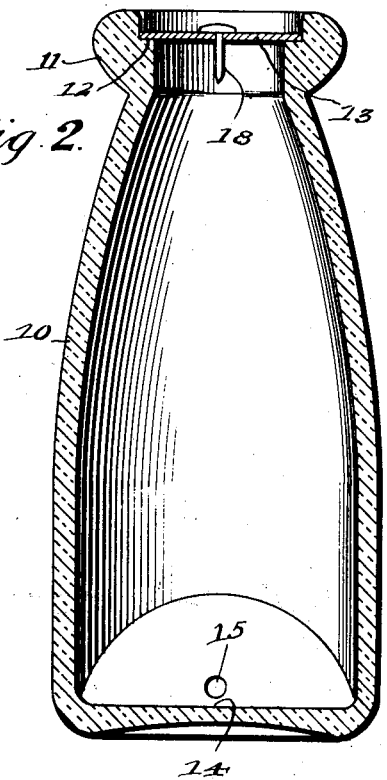
Figure 4:
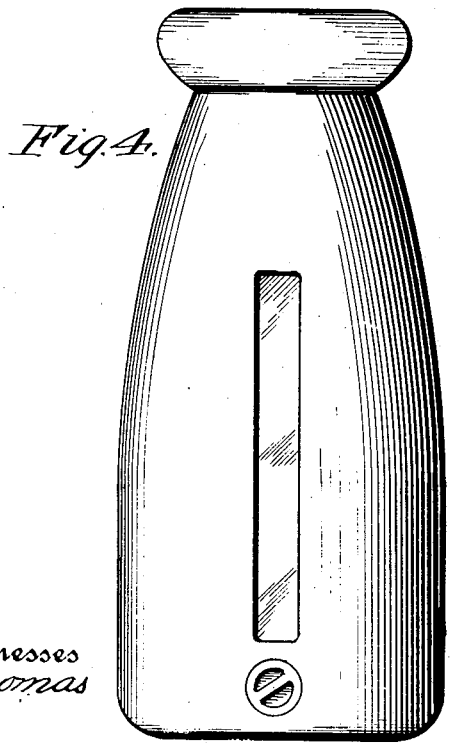
Figure 3:
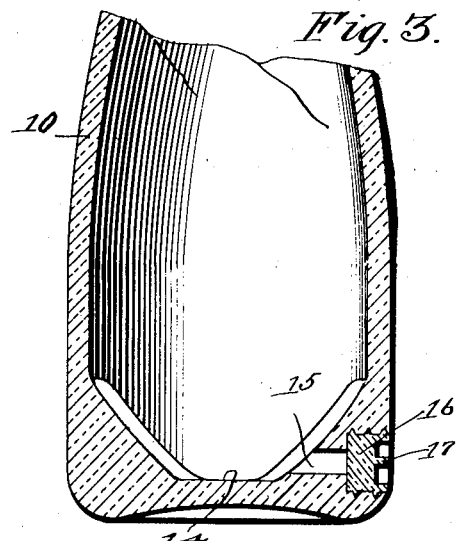

Figure 1 is an elevation of a receptacle constructed in accordance with my invention, Fig. 2 is a longitudinal sectional view taken through the center of the container at right angles to Fig. 1, Fig. 3 is a fragmentary longitudinal sectional view through the lower portion of the container taken at right angles to Fig. 2, and Fig. 4 is a side elevation of a modified form.

Referring more particularly to the drawing, the numeral 10 designates my container which may be formed of the shape of an ordinary milk bottle or which may have any other suitable or preferred shape. It is of course preferred that the container be constructed entirely of glass though it will be readily understood that it may be constructed of paraffined card board or even of crockery provided a portion of the container has a transparent window through which the line of demarcation between the milk and cream may be readily seen. Such a structure is shown in Fig. 4 which differs only from the other figures in this one respect.

As illustrated in the drawing, the container includes a neck portion 11 which is provided with an inwardly extending flange 12 upon which is seated the ordinary card board cap 13 forming a closure for the top of the container. At its lower portion the container has its walls thickened to constrict somewhat the bottom portion on the inside only whereby the inside of the bottom portion will be somewhat trough shape, as shown at 14. The wall adjacent the bottom is provided with a hole 15 communicating with the lowest part of the trough shape portion 14 and the outer end of this hole is normally closed by a suitable stopper which is preferably, as shown in the drawing, in the nature of the threaded plug 16 which has its outer face flush with the outer surface of the container and which is recessed to provide a finger engaging rib 17 whereby the plug may be grasped and rotated.

In order to provide for the entrance of air within the container, the cap 13 may have pushed therethrough a closure member 18 which might conveniently be a round headed tack.

In use the container is filled in the ordinary manner, it being understood that the plug 16 is in position. After filling, the card board cap 13 is seated upon the flange 12 in the ordinary manner and the closure member 18 pushed through the cap. After the milk has been standing some time and the cream has risen to the top, as is well known, in order to separate the cream from the milk it is merely necessary that the operator remove the closure member or tack 18 and then remove the plug 16. The milk will then pass out through the hole 15 without disturbing the line of separation between the milk and cream. As the milk is withdrawn the operator can watch the descent of this line of separation so that he may readily note when the milk has been withdrawn. The cream will then remain within the container and may also be withdrawn through the hole 15 if preferred, or may be poured out of the container in the ordinary manner.

From the foregoing description and a study of the drawing it will be apparent that I have thus provided a very simple container for milk which will be inexpensive in manufacture, which will be efficient and sanitary in use, and which will provide effective means for separating milk from cream.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A milk container comprising a body open at its upper end, means for closing said open upper end, means for permitting entrance of air within said body, the lower portion of the wall of said body being thickened at opposite points whereby to form a trough structure, said body being provided with a hole extending horizontally through one of said thickened portions, and a threaded plug normally closing said hole and having its outer end flush with the outer surface of said body, said trough structure serving to conduct milk to said hole.

In testimony whereof I affix my signature.

JENNIE M. SHOOK.